Feb. 28, 1933.  W. CHATER  1,899,079
STABILIZING DEVICE
Filed March 8, 1932  4 Sheets-Sheet 1
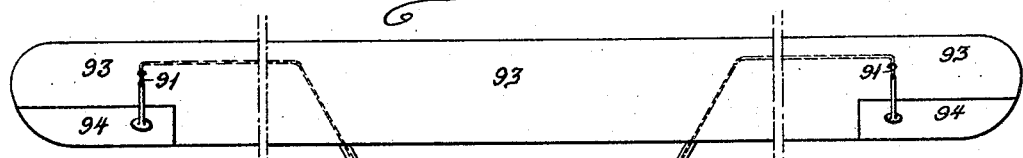
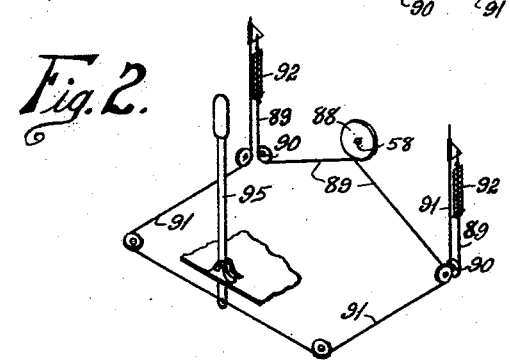
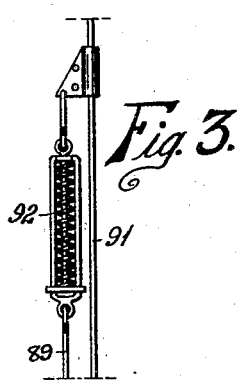
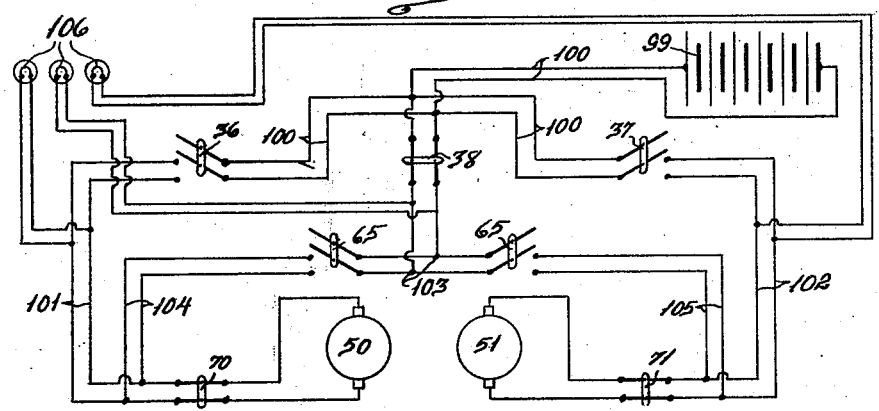
Inventor:
William Chater.
By Homer J. Sweet
Attorney.

Feb. 28, 1933.  W. CHATER  1,899,079
STABILIZING DEVICE
Filed March 8, 1932  4 Sheets-Sheet 2
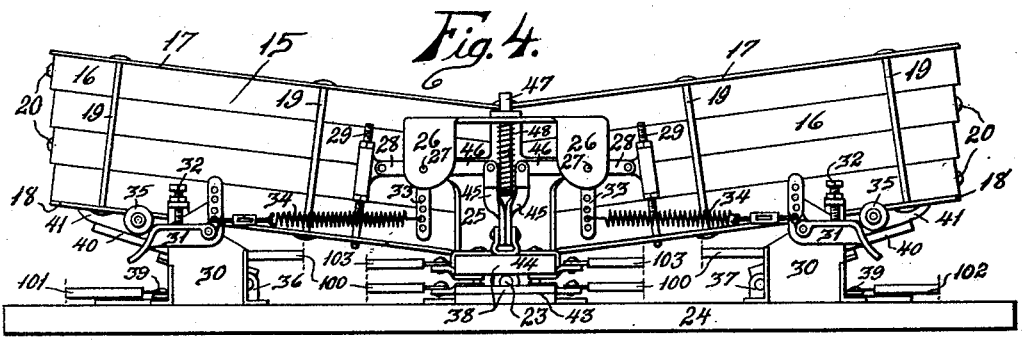
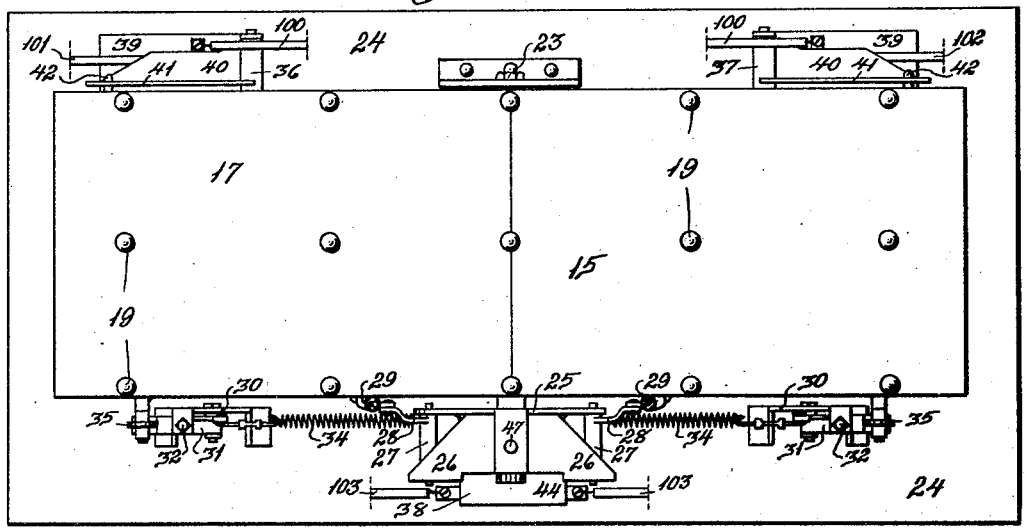
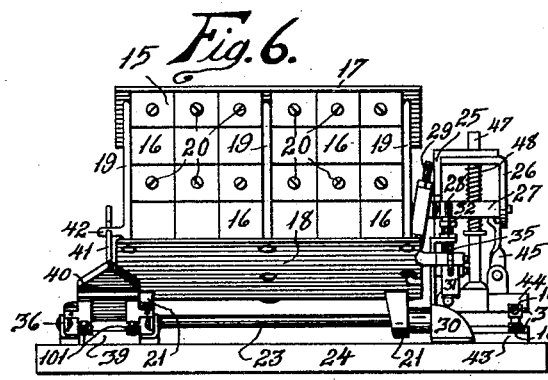
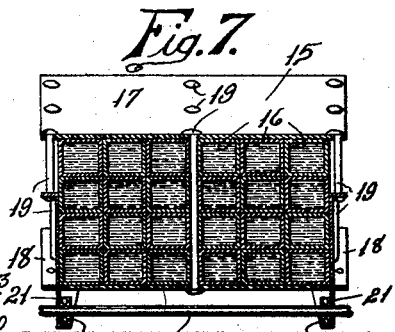
Inventor:
William Chater.
By Homer L. Sweet.
Attorney.

Feb. 28, 1933. W. CHATER 1,899,079
STABILIZING DEVICE
Filed March 8, 1932 4 Sheets-Sheet 3
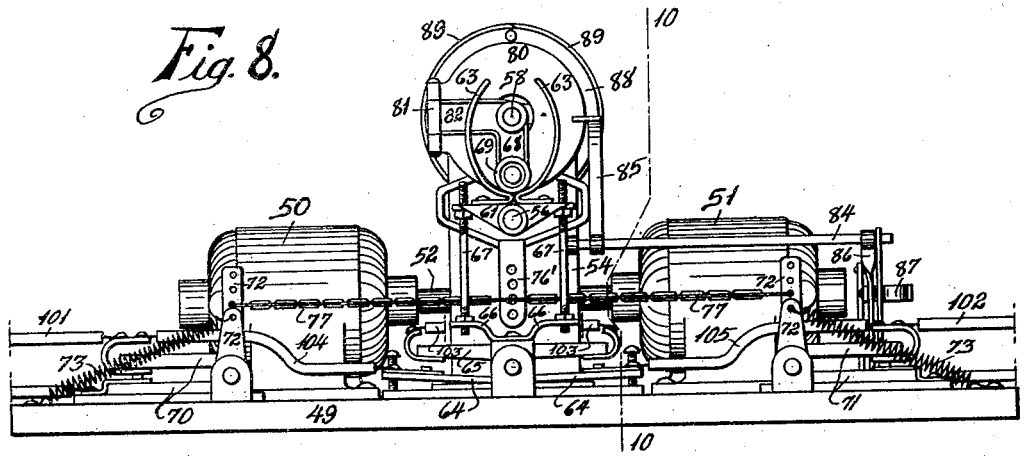
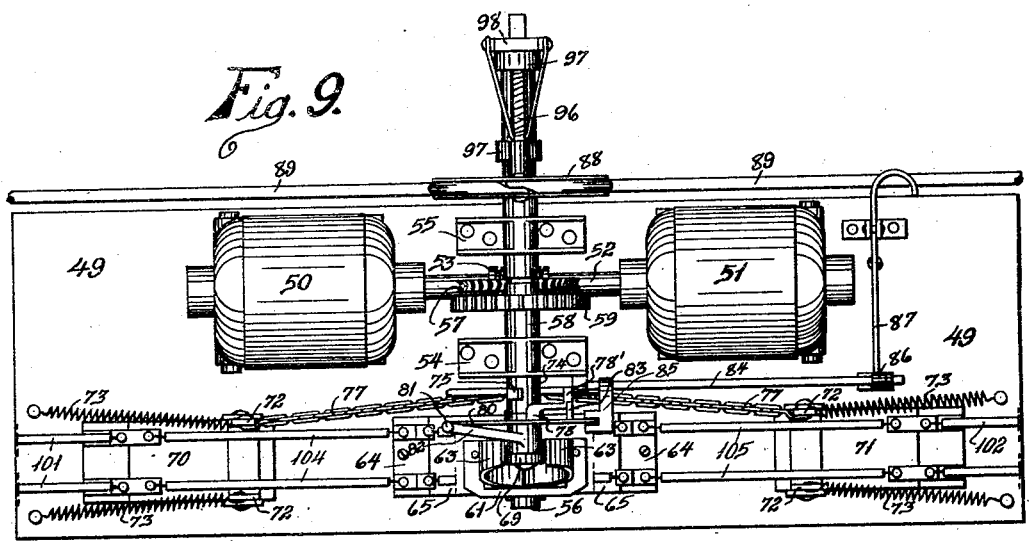
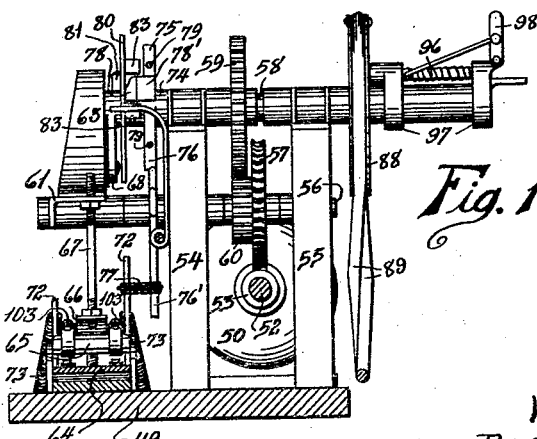
Inventor:
William Chater.
By Homer H. Sweet
Attorney.

Feb. 28, 1933.                    W. CHATER                    1,899,079
                              STABILIZING DEVICE
                        Filed March 8, 1932        4 Sheets-Sheet 4

Inventor:
William Chater.
By Howard G. Sweet
Attorney.

Patented Feb. 28, 1933

1,899,079

UNITED STATES PATENT OFFICE

WILLIAM CHATER, OF DENVER, COLORADO

STABILIZING DEVICE

Application filed March 8, 1932. Serial No. 597,569.

An object of this invention is to provide an improved stabilizing device.

A further object of the invention is to provide an improved stabilizing device susceptible of installation in air and water craft and operable to preserve balance of such craft in either or both lateral and longitudinal planes.

A further object of the invention is to provide an improved stabilizing device which is fully automatic in operation.

A further object of the invention is to provide an improved stabilizing device which is non-gyroscopic and in which all of the constituent elements are normally at rest.

A further object of the invention is to provide an improved, gravity-operable control unit in a stabilizing device.

A further object of the invention is to provide an improved apparatus where through displacement of a normally balanced control unit may function to alter the plane of its supporting craft.

A further object of the invention is to provide an improved stabilizing device which is light in weight, positive in operation, simple and inexpensive of installation, and susceptible, in aircraft, of connection with the normal controls of such craft for stabilizing effect through the normal control surfaces of the craft.

My invention consists in the construction, arrangement and combination of elements hereinafter set out, pointed out in my claims and illustrated by the accompanying drawings, in which—

Figure 11:
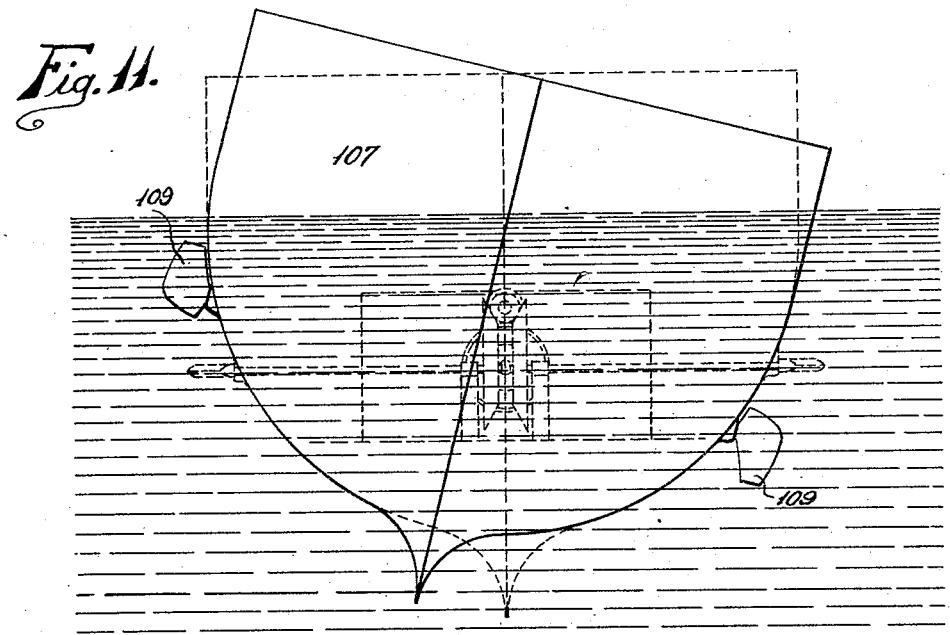
Figure 12:
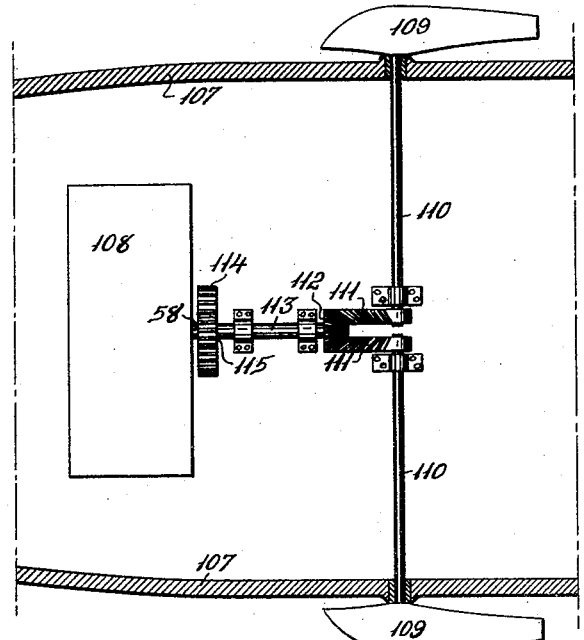
Figure 13:
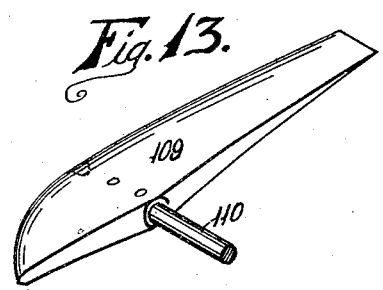

Figure 1 is a conventionalized view of a portion of an aircraft wherein the improved stabilizing device is shown mounted and connected for practical use, portions of the aircraft being omitted and broken away for greater clarity and to conserve space. Figure 2 is a diagrammatic view showing one method of connecting the stabilizing device with the normal controls of an aircraft. Figure 3 is a detail view, on an enlarged scale, showing a preferred method of yieldingly interconnecting operating cables of the stabilizing device and control cables of an aircraft. Figure 4 is a side elevation of the gravity-operable control unit assembly employed in the improvement. Figure 5 is a plan view of the showing of Fig. 4. Figure 6 is an end elevation of the showing of Figure 4. Figure 7 is a vertical section taken on the transverse median line of the balanced unit alone, other elements of the control assembly being omitted. Figure 8 is a side elevation of the operating assembly employed in the improvement. Figure 9 is a plan view of the showing of Figure 8. Figure 10 is a vertical section taken on the indicated line 10—10 of Figure 8. Figure 11 is a diagrammatic view showing one method of applying the invention to watercraft to minimize rolling thereof. Figure 12 is a plan view, partly in section, of the arrangement shown in Figure 11. Figure 13 is an isometric, detail view, on an enlarged scale, of the keel rudders employed in the arrangement shown in Figures 11 and 12. Figure 14 is a conventionalized diagram of the electrical devices and wiring employed in the improvement.

The invention comprises two distinct assemblies, one, the control unit assembly, being mounted in any convenient location on the supporting craft and arranged with its base in the normal horizontal plane of the craft and its axis of oscillation parallel with that craft axis about which stabilization is to be effected, the other, an operating assembly, being operatively connected with certain control surfaces carried by the craft and hence so located and installed on the craft as to facilitate such connection, the operative interrelation between the two assemblies being had through electrical connections readily adaptable to a wide variety of specific installations.

In the construction of the control unit assembly, a balanced, tiltable control unit is indicated generally by the numeral 15, which unit is formed of a plurality of elongated cells 16 arranged in nested relation and securely clamped together in any suitable manner, similar plates 17 and 18 bearing against the top and bottom, respectively, of the cell assembly and rigidly interconnected by means of bolts or rivets 19 being illustrated as one convenient and satisfactory clamping means. The cells 16 are identical, one with another, and may be employed in such number as may be desirable for a specific installation, twenty-four such cells being illustrated in this instance. Each of the cells 16 is shown as a relatively long, hollow box or tube formed of any suitable material in any convenient manner and completely sealed, an opening normally closed by a plug or screw 20 being provided in an end of each cell to permit loading or charging of said cell, as will hereinafter appear. The cells 16 are not straight, but are each bent at the center, as is clearly shown, to the form of a flattened V, the free ends of said cells being elevated equal amounts above their centers and the dihedral angle thus formed lying in the vertical plane of the assembly. While the cells are shown as straight on each side of their centers, it may of course be desirable in some instances to have them curved, the principle of operation being the same in either case.

Lugs 21 depend in spaced relation from the lower side of the assembly 15 in alinement beneath the apex of the dihedral angle thereof, which lugs support anti-friction devices 22 wherethrough is received a fixed shaft or axle 23 suitably supported on and in spaced, parallel relation above a base 24, thus mounting the assembly 15 for limited oscillation on and relative to said base. Due to its mounting and consequent high center of gravity, the assembly 15 is very sensitive and highly unstable and may not readily assume its balanced position shown in Figure 4, to overcome which condition means are provided operable to yieldingly support said assembly in the balanced position shown, which means further act to resist minor oscillations of said assembly, which means are hereinafter described. Adjacent one end of the shaft 23 a pedestal 25 is fixed to and rises from the base 24, the upper end of which pedestal is so formed as to provide a pair of downwardly-opening yokes 26 in spaced, parallel relation on opposite sides of the transverse median line of the assembly, across each of which yokes is rotatably mounted a short shaft 27 so positioned as to lie in parallel relation with the shaft 23. From the end of each shaft 27 most nearly adjacent the assembly 15, an arm 28 extends outwardly toward the free end of said assembly, the free end of each arm 28 being pivotally linked to a pull-rod 29 loosely engaging at one end through and hooked beneath a side margin of the clamp plate 18, so that, when one end of the assembly 15 is depressed, the pull-rod on that side of said assembly is moved downwardly and acts to rotate its respective shaft 27, while the pull-rod on the other side of the assembly slides freely through its portion of the plate 18 as said plate rises relative thereto. In substantial alinement longitudinally of the base 24 with the pedestal 25 and equally spaced on opposite sides thereof, similar pedestals 30 rise from said base adjacent the free ends of the assembly 15, each of which latter pedestals supports a bell-crank 31 pivotally mounted at its angle for actuation through a vertical arc and so arranged as to be normally positioned with one of its legs extending vertically upward and its other leg substantially horizontal and extending in the direction of the free end of the assembly 15, an adjustable stop 32 carried by an extension of the pedestal 30 being positioned above the horizontal leg of said bell-crank and arranged to limit upward arcuate travel thereof. An arm 33 depends from each of the shafts 27 at substantially right angles with its adjacent arm 28 to lie in approximately the same vertical plane with its adjacent vertical leg of the bell-crank 31, and a retractile coil spring 34 operatively interconnects each arm 33 and the vertical leg of its adjacent bell-crank 31, adjusting means, such as turnbuckles, being provided for the springs 34 which, in combination with a plurality of spring attaching points in the arms 33 and vertical legs of the bell-cranks 31, permit variation and adjustment of the tension and leverage applied through said springs 34. Rollers 35 are mounted for free rotation on stub shafts extending horizontally from the clamp plate 18 adjacent the free ends of the assembly 15, said rollers 35 being thus positioned adjacent and for rolling contact with the horizontal legs of the bell-cranks 31, the outer ends of which horizontal legs are curved outwardly and downwardly to provide arcuate surfaces adapted to be engaged by said rollers and operative to retard the speed of oscillation of the assembly 15. It is obvious that the arrangement above described serves to steady the assembly 15 in its balanced position, the tension of the springs 34 having to be overcome before said assembly may tilt appreciably, said springs and connections acting further to return the assembly promptly to its balanced position when the base 24 approaches the horizontal. To provide for positive tilting action of the assembly 15 as the base 24 is moved from its normal horizontal position, the cells 16 are charged with liquid through the openings provided for that purpose, each of the cells receiving an equal amount of the liquid and only so much as may be received without quite filling the mid-section of each cell when the assembly is in balanced position. The liquid employed may vary in kind and quantity in specific installations, but should be characterized, generally, by low expansive and contractive coefficients, a low freezing point and freedom from corrosive effects. It is readily apparent that with the cells charged as above set forth, any longitudinal tilting of the base 24 causes the liquid within the cells 16 to move toward the low end of said base and thus unbalance the assembly 15, overcoming the tension of the springs 34 and depressing that end of said assembly adjacent the low end of the base, in which position the assembly 15 is held by weight of the liquid until such time as the base again approaches the horizontal and the liquid is permitted to return to the center of the assembly, whereupon the springs and related connections return said assembly to its balanced position with a minimum of oscillation. Three electrical switches are positioned on the base 24 for operation and control by the assembly 15, two of said switches, designated by the numerals 36 and 37, being positioned adjacent the free ends of said assembly and the third switch, 38, being located adjacent the pedestal 25 beneath and between the yokes 26 thereof. The switches 36 and 37 are identical in form, style and operation and may be constructed in any suitable manner to accomplish the results desired, those shown in the drawings comprising each a base portion 39 secured to the base 24 and carrying a pair of spaced contacts, and an upper portion 40 hinged at one end to said base portion for actuation through a vertical arc relative thereto and carrying a pair of spaced contacts adapted at times to register with and engage the contacts of the corresponding base portion. The upper portions 40 of the switches 36 and 37 are operatively connected with the adjacent ends of the assembly 15, fins 41 rising from said portions 40 and formed with longitudinal slots adapted to engage about and slide on pins 42 fixed to and projecting laterally from said assembly 15 being shown as one suitable means of effecting the connection desired, the relation of the connected elements being such that both switches 36 and 37 are held in open circuit position when the assembly 15 is in its normal balanced position and either of said switches being movable to closed circuit position through tilting action of said assembly, the switch adjacent the depressed end of said assembly being, naturally, the one to be so closed. The switch 38 likewise comprises a base portion 43 fixed to the base 24 and carrying a pair of spaced contacts and an upper portion 44 hinged to said portion 43 for actuation through a vertical arc and provided with spaced contacts adapted to engage at times with the contacts of the fixed portion. It is desired that the switch 38 be held in closed circuit position when the assembly 15 is in its balanced position and moved to open circuit position when said assembly tilts in either direction, to which end links 45 are hinged at their lower ends to the switch portion 44 and rise therefrom to pivotal connection at their upper ends with arms 46 fixed to and extending inwardly from the shafts 27, so that when either of the shafts 27 is rotated by tilting action of the assembly 15, the free end of the arm 46 carried by said shaft is moved upwardly through a vertical arc and acts through its link 45 to lift the switch portion 44 and disengage the contacts of the switch 38, a stem 47 pivoted at its lower end to the switch portion 44 rising therefrom through a guide aperture in the upper portion of the pedestal 25 and supporting an expansive coil spring 48 bearing between the upper portion of said pedestal and an annular flange carried by said stem and operable to urge the switch portion 44 into contact engagement with the switch portion 43. Thus, when the assembly 15 is in its balanced position the switch 38 is in closed circuit position and the switches 36 and 37 both in open circuit position, tilting of the assembly 15 serving to open the switch 38 and close the switch 36 or 37 adjacent the depressed end of said assembly, which closing of a switch 36 or 37 serves to limit tilting action of the assembly.

The operating assembly wherethrough the tilting action of the assembly 15 is made effective comprises a suitable base 49 whereon two identical electric motors 50 and 51 are spaced in axial alinement for rotation in opposite directions. A common shaft 52 susceptible of being driven by either of the motors 50 or 51 connects between said motors and is provided with a suitable worm 53 therebetween. Similar posts or supports 54 and 55 are secured to and rise perpendicularly from the base 49 between the motors 50 and 51 and on opposite sides of the shaft 52, which posts suitably support a shaft 56 horizontally disposed therebetween above and at right angles with the motor shaft 52, a worm wheel 57 being mounted for free rotation on said shaft 56 between the posts 54 and 55 and in operative engagement with the worm 53. Parallel with and in spaced relation above the shaft 56 is positioned a second shaft 58 journaled for free rotation in suitable bearings carried by the posts 54 and 55, said shaft 58 carrying a gear 59 in fixed relation therewith between said posts and in meshing relation with a pinion 60 fixed to and rotatable with the worm wheel 57. With the arrangement above described, it is apparent that operation of either of the motors 50 or 51 acts through the shaft 52, worm 53, worm wheel 57, pinion 60 and gear 59 to rotate the shaft 58 in one direction, while operation of the other motor acts to rotate said shaft in the opposite direction. The shaft 56 is extended axially beyond the post 54 to support a bracket 61 freely rotatable on said shaft and projecting laterally on each side thereof, from the upper side of which bracket rise arcuate fingers 63 in fixed relation with said bracket and with their concave sides in opposition and in embracing, eccentric relation with the extended end of the shaft 58. Directly beneath the bracket 61 is positioned a double-acting switch comprising a base portion 64 secured to and extending longitudinally of the base 49 and provided with a pair of spaced contacts adjacent each of its ends, and a movable upper portion 65 hinged at its transverse center in spaced relation above the portion 64 and provided with a pair of spaced contacts at each end adapted to engage at times the contacts of the adjacent ends of the portion 64, the hinge axis of said switch assembly being parallel with the shaft 58. Spring fingers 66 rise from and extend in opposite directions longitudinally of the switch portion 64, and adjustable push-rods 67 connect between each of said spring fingers and the corresponding lateral extension of the bracket 61, so that oscillation of said bracket on the shaft 56 acts to oscillate the switch portion 65 to one or the other of its closed circuit positions, travel of said bracket beyond that required to close the switch being permitted by the yielding character of the spring fingers 66. An arm 68 is fixed to and extends radially from the end of the shaft 58 adjacent the arcuate fingers 63 and supports on its free end a roller 69 arranged for peripheral engagement with the concave surfaces of said fingers when the said shaft 58 is rotated, the arm 68 being of such length as to position the roller 69 in engagement with the lowermost portion of the yoke formed by the fingers 63 when the shaft 58 is in its normal or median position, which arrangement operates, when the shaft 58 is rotated, to swing the bracket and finger assembly, 61—63, about its mounting on the shaft 56 for oscillation of the switch portion 65 to one or the other of its closed circuit positions. Spaced equally from and on opposite sides of the switch 64—65, identical switch assemblies 70 and 71 are positioned on the base 49 adjacent the motors 50 and 51. Each of the switch assemblies 70 and 71 comprises a base portion fixed to the base 49 and provided with a pair of spaced contacts and an upper portion hinged at one end to the base portion for actuation through a vertical arc relative thereto and provided with a pair of spaced contacts adapted to engage the contacts of its base portion at times, said switch assemblies being mounted on the base 49 with their hinged ends adjacent the switch assembly 64—65. Fingers 72 are fixed to and rise perpendicularly from the hinged upper portions of the switch assemblies 70 and 71 and retractile coil springs 73 engage between upper portions of said fingers and the base 49 to yieldingly hold said switch assemblies in normal closed circuit position. Means operable through rotation of the shaft 58 are provided whereby either of the switch assemblies 70 or 71 may be automatically actuated, at times, against the tension of its springs 73 to open circuit position, said means comprising a hub 74 loosely mounted on the shaft 58 between the arm 68 and the post 54, from which hub extend diametrically-opposed, radial arms 75 and 76. The hub 74 is normally so positioned as to dispose the arm 75 in vertical position above the shaft 58 and the arm 76 in vertically-depending relation below said shaft, said latter arm being formed with an elongated, horizontally-disposed loop on its lower end in embracing relation with the shaft 56 and a downward extension 76' depending from said loop below said shaft 56 in alinement with said arm 76. One of the fingers 72 of each of the switch assemblies 70 and 71 is extended upwardly and provided with a plurality of vertically spaced attaching points corresponding with a plurality of similar, vertically spaced attaching points carried by the arm extension 76', and flexible connections, such as link chains 77, engage between and connect attaching points of the extended fingers 72 and arm extension 76', so that, when the arm extension 76' is in its normal, vertical position both switch assemblies 70 and 71 are held in circuit closing relation by their springs 73, arcuate travel of said arm extension in one direction exerting a pull on one of the connecting chains 77 which acts through its finger 72 to overcome the tension of the corresponding springs 73 and open one of the switch assemblies, opposite travel of said arm extension acting in the same manner to open the other of the switch assemblies. To operate the above described switch actuating means, an arm 78 is fixed to and extends substantially radially of the shaft 58 adjacent and at approximately right angles with the arm 68, which arm 78 is formed with an end lug 78' lying in the plane of rotation of the arms 75 and 76 and substantially half way therebetween, so that, as said shaft 58 and arm 78 are rotated, said lug 78' travels into engagement with one or the other of the arms 75 and 76 and rotates the hub 74 slightly on said shaft 58, which hub rotation acts to swing the arm extension 76' and exert the pull on one of the chains 77 necessary to unseat one of the switch assemblies 70 or 71. Adjusting screws 79 are operatively positioned through the arms 75 and 76 tangential to the orbit of rotation of the lug 78' and in position to be engaged by said lug, so that adjustment of the range of travel of said lug prior to its operation of the switch actuating means may readily be had through adjustment of the projection of said screws relative to the faces of their respective arms. A further means of varying the inoperative travel of the lug 78' which may be employed at will and without disturbing any of the adjustments of the assembly, is provided, said latter means comprising a relatively thin disc 80 mounted in loosely embracing, concentric and perpendicular relation with the shaft 58 between the radial arms 68 and 78 and supported by means of a hinge connection 81 with the outer end of a radial arm 82 extending in fixed relation from said shaft 58 at substantially right angles with the arm 68, the free side of said disc 80 being thus mounted for limited motion toward and away from the lug 78'. Identical lugs 83 are spaced apart on and extend in fixed relation perpendicularly from the face of the disc 80 adjacent the arm 78, said lugs being spaced apart a distance equal to the width of the lug 78' and so positioned on said disc as to embrace said lug 78', the length of the lugs 83 being such as to permit them to pass freely by the arms 75 and 76 when the disc is adjacent the arm 68 and the shaft 58 is rotated and such as to bring them into intersecting relation with the vertical plane of said arms 75 and 76 when said disc is moved adjacent the arm 78, in which latter position the lugs 83 embrace and lie on opposite sides of the lug 78' and may engage and operate the arms 75 and 76 in the same manner as would the lug 78', the interposing of said lugs 83 thus serving to operate said arms 75 and 76 with less rotation of the shaft 58 than is required for the lug 78' alone. Any suitable means for manually controlling the position of the disc 80 may be employed, one such means being illustrated as comprising a horizontally-disposed rock-shaft 84 from which a fixed finger 85 rises to embrace at its upper end the movable margin of said disc, a fixed lever 86 depending from said rock-shaft in operative engagement with a latchable slide bar 87, arranged for manual adjustment, providing means for actuating said rock-shaft to adjust said disc to either of its two limits, as may be desired. The shaft 58 is the control surface operating element of the entire assembly and is arranged to be so connected to the control surfaces of the craft to be stabilized as will best give effect in a specific installation, the arrangement shown in Figures 1, 2, 3, 8, 9 and 10 being particularly adapted for use with aircraft. In the figures last above noted, the shaft 58 is illustrated as extended axially beyond the post 55 to provide support for a suitable drum or grooved pulley 88 mounted for free rotation thereon, flexible cables 89 being secured to said drum and leading in opposite directions therefrom through suitable guide pulleys 90 to operative connection with the normal control cables 91 of the craft. The connection between the cables 89 and 91 may be made in any suitable manner, but for best results it is desirable that a resilient element be provided in each cable 89 between the drum 88 and the point of connection with the cable 91, one satisfactory form of such an element being illustrated at 92 in Figures 2 and 3.

In the showing of Figure 1 a conventionalized airplane is illustrated with a main wing 93 provided with hinged wing flaps or ailerons 94 to which the control cables 91 are led from a control stick 95 in a common manner to provide means for manually controlling the lateral position of said main wing, the arrangement shown being but typical of many such varying only in detail. When the drum 88 is connected into the control system as shown in Figures 1 and 2, it becomes a part of said system and so long as the drum is free to rotate on its shaft it interferes in no way with the normal manipulation of the controls, rotating in one direction or the other as the stick 95 is swung to actuate the surfaces 94, it being obvious that rotation of said drum under the influence of the apparatus previously described would have the same effect on the surfaces 94 as would be had through corresponding movement of the stick 95. To make the drum 88 effective in the operation of the controls 91, means are provided for locking said drum to the shaft 58 for rotation therewith, when desired, said means being illustrated as a spring-pressed pin or plunger 96 spaced from and in parallel relation with the shaft 58 and mounted for axial reciprocation in suitable guides 97 fixed to said shaft, said pin 96 being arranged to engage at one end within a hole formed in the drum 88 and thus lock said drum to the shaft 58, said hole being so positioned as to synchronize the neutral position of the cables 89 attached to said drum with the neutral position of said shaft. The pin 96 is normally spring-pressed into locking engagement with the drum 88, but may be withdrawn from such engagement when it is desired to release the craft controls from the automatic action of the invention, a manually-operable throw 98 hinged to one of the guides 97 and operatively connected with the pin 96 being illustrated as one suitable means whereby said pin may be withdrawn and retained in its disengaged relation.

The elements of the apparatus hereabove described are electrically interconnected for effective automatic operation as shown in Figure 14. In said latter figure, the numeral 99 designates a source of electrical energy, such as a storage battery, which is mounted on the craft carrying the stabilizing device in any convenient location and from whence a circuit 100 leads, through suitable branches, to operative connection with each of the switches 36, 37 and 38. From the side of the switch 36 opposite the circuit 100, a circuit 101 leads through the switch 70 to operative connection with the motor 50, so that, when the switches 36 and 70 are closed, a closed circuit including the source of energy 99 and the motor 50 is established. In like manner a circuit 102 leads from the side of the switch 37 opposite the circuit 100 through the switch 71 to operative connection with the motor 51, so that, when said switches 37 and 71 are closed, the motor 51 is operatively included in the circuit from said source of energy. That portion of the circuit 100 connecting with the switch 38 is continued beyond said switch as the circuit 103 which leads to the switch element 65 where it is branched for operative connection with the contacts carried at each end of said element, leads 104 operatively connecting the contacts at one end of the switch base 64 with the circuit 101 between the switches 36 and 70 and similar leads 105 connecting the contacts at the other end of the switch base 64 with the circuit 102 between the switches 37 and 71.

In the practical operation of the apparatus constructed, arranged, connected and installed as above described, the assembly 15 assumes and retains its balanced position so long as the main wing 93 of the craft is substantially horizontal, the switches 38, 70 and 71 are closed, the switches 36, 37 and 64—65 open and the wing flaps 94 in neutral relation with the main wing by virtue of the position of the drum 88 on its shaft 58 and proper adjustment and interconnection of the cables 89 and 91, the motors 50 and 51 being hence inoperative so long as the lateral balance of the craft is maintained. When the main wing 93 is moved out of its horizontal position an appreciable amount, the flow of liquid in the cells 16 tilts the assembly 15 toward the low end of said wing, which action closes the switch 36 or 37 adjacent said low end and simultaneously opens the switch 38, thus closing a circuit from the source of energy 99 to one or the other of the motors 50, 51, actuating said motor to rotate the shaft 58 and drum 88 and consequently set the wing flaps 94 as may be required to return the main wing to its horizontal position, the operation of said motor being continued until its switch 70 or 71 is automatically opened through contact of the lug 78' with one of the arms 75 or 76; during which time the roller 69 has acted through the fingers 63 to close that end of the switch 64—65 controlling the inoperative motor. As the operation of the motor is arrested, the wing flaps 94 are set to return the main wing to normal position, one of the switches 36, 37 is open and the other closed, the switch 38 is open, one of the switches 70, 71 open and the other closed and the end of the switch 64—65 controlling the previously inoperative motor closed, no circuit being completed to either motor, in which relation the elements remain until the main wing approaches its normal position. As the main wing approaches the horizontal and the liquid in the cells 16 flows back towards the midportion of the assembly 15, the balancing devices of said assembly return the latter to its balanced position, which action also closes the switch 38, thereby completing a circuit from the source of energy to the previously inoperative motor, actuating said motor and thereby driving the shaft 58 to return the wing flaps 94 to their neutral position, continued rotation of said shaft 58 acting through the roller 69 and arcuate fingers 63 to open the switch 64—65 when the wing flaps have reached their neutral relation and thus arrest the motor, the cycle of operations thus completed leaving the elements of the apparatus in the relation shown in the drawings and ready for repetition of the cycle whenever the main wing 93 is displaced from its normal horizontal position. As a visual check on the relative position of the main wing and on the operation of the apparatus, electrical indicators, indicated conventionally as incandescent bulbs 106, may be conveniently arranged, as on the instrument panel of the craft, and operatively connected as shown in Figure 14, the righthand indicator connecting with the circuit 102 between the switches 37 and 71 and hence registering to indicate a low right wing when the switch 37 is closed, the lefthand indicator connecting with the circuit 101 between the switches 36 and 70 for registration to indicate a low left wing when the switch 36 is closed, and the center indicator connecting with the circuit 103 between the switches 38 and 64—65 for registration when said switch 38 is closed, thus indicating approximate normal position of the main wing.

It is of course obvious that use of the apparatus is not limited to control of the lateral stability of the craft, but may be extended to control the logitudinal stability as well, in which latter case the base 24 is positioned longitudinally of and in the normal horizontal plane of the craft and the drum 88 is operatively connected with the controls operating the horizontal rudder or elevator of the craft. Thus two installations of the apparatus on a single craft provide complete automatic control whereby the craft may be maintained in lateral and longitudinal balance in a horizontal plane, either or both such installations being readily disconnected to permit manual operation of the controls, when desired.

The reasons for dividing the assembly 15 into a plurality of relatively small longitudinal cells are several and of major practical importance. Were the assembly 15 a single cell or box having the same capacity as the assembled cells 16 and charged with the same amount of liquid, the center of gravity of the assembly would be much lower than is the case in the arrangement shown and the liquid contents of the assembly would surge and splash to a marked degree, causing the assembly to oscillate and destroying much of its operative efficiency. The small amount of liquid contained in each of the cells shown is less subject to inertia effects and comes rapidly to rest when the assembly assumes one or another of its positions, thus making for rapid and postive action of the switches controlled by the assembly. Again, particularly in aircraft, there may be inclination of the assembly axis out of the horizontal at a time when it is desired to have the assembly function, in which event it is highly important that the liquid be confined in relatively small cells to prevent displacement of the center of gravity to an extent destructive of operative effect; in a single cell or box, the liquid would naturally pile against one or the other of the side walls when the assembly axis was inclined, but with the cell construction shown the liquid is retained in the various compartments where is continues to function under the influence of gravity, as described, until the assembly axis approaches the vertical. The cells may be employed in various arrangements and in such number as may be indicated to give desired results in a specific installation, but a single, large cell is so subject to inertia effects acting through its liquid as to be highly unsatisfactory.

In Figures 11, 12 and 13 is illustrated a conventional adaptation of the invention to watercraft for the purpose of enhacing lateral stability and minimizing rolling thereof. In the figures last above noted, a watercraft is indicated generally by the numeral 107, on which craft the apparatus comprising the invention is suitably positioned, the box or housing 108 representing an installation of the complete apparatus. On opposite sides of and well below the normal waterline of the craft, suitable keel-rudders 109, each extended laterally and longitudinally in the horizontal plane and contoured to offer minimum resistance to its passage through the water in the direction of the craft travel, are fixed to the ends of alined shafts 110 mounted for rotation transversely of the craft. On the inner, adjacent ends of the shafts 110 are fixed identical, segmental bevel gears 111 which mesh with opposite sides of a bevel pinion 112 fixed on one end of a longitudinally-disposed, rotatable shaft 113, a gear 114 on the other end of the shaft 113 meshing with a pinion 115 carried by the shaft 58 of the apparatus, so that rotation of said shaft 58 acts to rotate the shafts 110 simultaneously and in opposite directions, the arrangement of the apparatus being such that rotation of said shaft 58 acts to incline the keel-rudder 109 on the low side of the craft to elevate that side of the craft as it moves through the water and to incline the keel-rudder on the high side of the craft to lower that side, the operation of the elements of the apparatus being the same with reference to the lateral inclination of the craft as have been previously described for aircraft.

It is obvious that many changes in the specific form, construction and arrangement of the elements of the invention may be had without departing from the spirit thereof, and that specific installations of the apparatus may require infinite variation of the specific mechanical means and connections wherethrough the automatic action of the apparatus is made effective, hence I wish to be understood as being limited solely by the scope of the appended claims rather than by any details of the illustrative showing and foregoing description.

I claim as my invention—

1. In combination with a fluid-traversing craft having relatively-movable, fluid-engaging elements whereby the horizontal attitude of said craft may be controlled, means automatically operable to stabilize said craft relative to one of its horizontal axes, said means comprising a tiltable unit mounted on said craft for limited oscillation in a plane perpendicular to the axis about which stabilizing effect is desired, yielding means operable to normally position said unit intermediate the limits of its range of travel, normally open switches adjacent the ends of said unit and arranged to be individually closed by downward motion of the corresponding end of said unit, independent electrical circuits controlled by said switches, an electric motor in each of said circuits, a shaft arranged to be driven in one direction by one of said motors and in the opposite direction by the other of said motors, and operative connections between said shaft and the relatively-movable craft elements.

2. In combination with a fluid-traversing craft having relatively-movable, fluid-engaging elements whereby the horizontal attitude of said craft may be controlled, means automatically operable to stabilize said craft relative to one of its horizontal axes, said means comprising a tiltable unit mounted on said craft for oscillation in a plane perpendicular to the axis about which stabilizing effect is desired, yielding means operable to normally position said unit in vertically balanced relation above its axis, normally open switches adjacent each end of said unit and arranged to be individually closed by downward motion of the corresponding end of said unit, independent electrical circuits controlled by said switches, an electric motor in each of said circuits, a shaft arranged to be driven in one direction by one of said motors and in the opposite direction by the other of said motors, operative connections between said shaft and the relatively-movable craft elements, and anomatic means operable through rotation of said shaft for opening the circuit to either of said motors.

3. In combination with a fluid-traversing craft having relatively-movable, fluid-engaging elements whereby the horizontal attitude of said craft may be controlled, means automatically operable to stabilize said craft relative to one of its horizontal axes, said means comprising a gravity-tiltable control unit mounted for oscillation in a plane perpendicular to the axis about which stabilizing effect is to be had, yieldable means normally positioning said control unit intermediate the limits of its range of travel, an operating unit including a pair of motors arranged for opposite rotation, a shaft in driven relation with said motors, operative connections between said shaft and the relatively-movable craft elements and electrical means and connections whereby tilting of said control unit may act to selectively energize said motors.

4. In combination with a fluid-traversing craft having relatively-movable, fluid-engaging elements whereby the horizontal attitude of said craft may be controlled, means automatically operable to stabilize said craft relative to one of its horizontal axes, said means comprising an operating unit including a pair of motors arranged from opposite rotation, a shaft in driven relation with said motors, operative connections between said shaft and the relatively-movable craft elements, a gravity-operable, tiltable unit arranged with its axis of oscillation parallel with that craft axis about which stabilization is desired, electrical means and connections wherethrough oscillation of said tiltable unit may act to selectively energize said motors, automatic means operable through rotation of said shaft to arrest the operation of either of said motors and further operable to complete a circuit to the previously inoperative motor as said tiltable unit approaches its normal balanced position.

5. In a stabilizing device, a base positioned normally in a horizontal plane, an axis carried by said base in parallel relation with the axis of stabilization, a gravity-tiltable assembly mounted above and for limited oscillation relative to said axis, said assembly comprising a plurality of identical, elongated cells each forming a dihedral angle in the plane of its oscillation, said cells being arranged with their apices in a common plane including the axis of oscillation and diverging upwardly and outwardly from said plane and in closely nested, compact interrelation, liquid partially filling each of said cells, yielding means engaging between said cell assembly and said base to normally position the former in its balanced, median relation, electrical circuits including switches in operative relation with said cell assembly, and a power assembly served by said circuits.

6. In a stabilizing device, a base positioned normally in a horizontal plane, an axis carried by said base in parallel relation with the axis of stabilization, a gravity-tiltable assembly mounted above and for limited oscillation relative to said axis, said assembly comprising a plurality of identical cells in compact, closely nested interrelation, said cells diverging upwardly and outwardly from a vertical plane containing said axis and being each partially filled with liquid, means and connections carried by said base whereby said cell assembly may be yieldingly held in its balanced, median position when said base is horizontal, a normally open switch adjacent and in operative connection with each end of said cell assembly and selectively closable through tilting action of said assembly, a normally closed switch adjacent the midportion of said assembly and arranged to be opened through tilting of said assembly, electrical circuits controlled by said switches and a power assembly served by said circuits.

7. In a stabilizing device, a driven shaft operable to position stabilizing elements, a pair of electric motors arranged for opposite rotation and in driving relation with said shaft, normally open circuits serving said motors, a normally-balanced, gravity-tiltable control unit automatically operable to close one or the other of said circuits when unbalanced, means operable by rotation of said shaft to automatically open the circuit to an operative motor at a predetermined point in the rotation of said shaft, said last means being further operable to close a supplemental circuit to the previously inoperative motor and a switch in operative relation with said control unit and operable as said unit approaches its balanced position to complete said supplemental circuit and energize said previously inoperative motor whereby said shaft is returned to normal position.

8. In a stabilizing device, a driven shaft operable to position stabilizing elements, a pair of electric motors arranged for opposite rotation and in driving relation with said shaft, speed-reducing gearing between said motors and shaft, normally open circuits serving said motors, a normally-balanced, gravity-tiltable control unit automatically operable to close one or the other of said circuits when unbalanced, means operable by rotation of said shaft to automatically open the circuit to an operative motor at a predetermined point in the rotation of said shaft, said means including switches in each motor circuit, an arm mounted for free rotation on said shaft and extending radially on each side thereof, spring means normally holding said switches in closed position, flexible connections between the depending portion of said arm and said switches whereby the latter may be opened against the pressure of their springs, and an arm fixed to said shaft for rotation therewith and formed with a lug adapted to engage one or the other of the first arm extensions and swing the latter about said shaft to switch-opening position; together with means operable by rotation of said shaft to establish a supplemental circuit to the previously inoperative motor for return of said shaft to its normal position as said control unit approaches its normal balanced relation.

Signed at Denver, in the county of Denver and State of Colorado, this third day of December, 1931.

WILLIAM CHATER.